US012686477B1

(12) United States Patent
Graetz et al.

(10) Patent No.: US 12,686,477 B1
(45) Date of Patent: Jul. 21, 2026

(54) MAGNETOHYDRODYNAMIC PUMP

(71) Applicant: HRL LABORATORIES, LLC,
Malibu, CA (US)

(72) Inventors: Jason A. Graetz, Calabasas, CA (US);
John J. Vajo, West Hills, CA (US)

(73) Assignee: HRL LABORATORIES, LLC,
Malibu, CA (US)

( * ) Notice: Subject to any disclaimer, the term of this
patent is extended or adjusted under 35
U.S.C. 154(b) by 356 days.

(21) Appl. No.: 18/438,340

(22) Filed: Feb. 9, 2024

Related U.S. Application Data

(60) Provisional application No. 63/464,857, filed on May
8, 2023, provisional application No. 63/464,864, filed
on May 8, 2023.

(51) Int. Cl.
B63H 11/02 (2006.01)
B63G 8/00 (2006.01)
H02K 44/02 (2006.01)

(52) U.S. Cl.
CPC ........... B63H 11/025 (2013.01); H02K 44/02
(2013.01); B63G 2008/004 (2013.01)

(58) Field of Classification Search
CPC ...... B63H 11/025; H02K 44/02; H02K 44/08;
B63G 2008/004
See application file for complete search history.

(56) References Cited

U.S. PATENT DOCUMENTS 5,284,106 A * 2/1994 Meng ................... B63H 11/025
114/238

FOREIGN PATENT DOCUMENTS

FR          3115952 A1 * 5/2022 ............. H02K 44/06
WO     WO 1989/009724      10/1989

OTHER PUBLICATIONS

Brennan, Joseph C., et al., Flexible conformable hydrophobized
surfaces for turbulent flow drag reduction, Scientific Reports, vol. 5,
pp. 1-9 (Jan. 2015).
Hao, YanMing, et al., Character of an electrochemical hydrogen
pump with internal humidifier and dead-end anode channel, Int'l. J.
of Hydrogen Energy, vol. 41, pp. 13879-13887 (2016).
Hu, Haibao, et al., Significant and stable drag reduction with air
rings confined by alternated superhydrophobic and hydrophilic
strips, Sci. Adv., vol. 3, pp. 1-9 (Sep. 2017).

(Continued)

*Primary Examiner* — Timothy D Collins
(74) *Attorney, Agent, or Firm* — Lewis Roca Rothgerber
Christie LLP

(57)          ABSTRACT

A magnetohydrodynamic (MHD) device including an elec-
trochemical cell, an aqueous liquid, and a magnet is pro-
vided. The electrochemical cell includes a first and a second
electrode and an enclosed gas volume fluidly connecting the
two electrodes. The first electrode generates a reaction gas at
a first rate, the second electrode consumes the reaction gas
at a second rate, the first rate being substantially equal to the
second rate. The aqueous liquid is between the first electrode
and the second electrode and includes a current having a
direction. The magnet generates a magnetic field having a
direction normal to the direction of the current. The MHD
device produces a propulsive force having a direction simul-
taneously normal to the direction of the magnetic field and
the direction of the current.

22 Claims, 4 Drawing Sheets

(56)  References Cited

OTHER PUBLICATIONS

Saranadhi, Dhananjai, et al., Sustained drag reduction in a turbulent flow using a low-temperature Leidenfrost surface, Sci. Adv., vol. 2, pp. 1-9 (Oct. 2016).

Sasakawa, Yohei, Yamamoto-1 The World's First Superconducting MHD Propulsion Ship, The Ship & Ocean Foundation, pp. 1-166 (Oct. 1996).

* cited by examiner

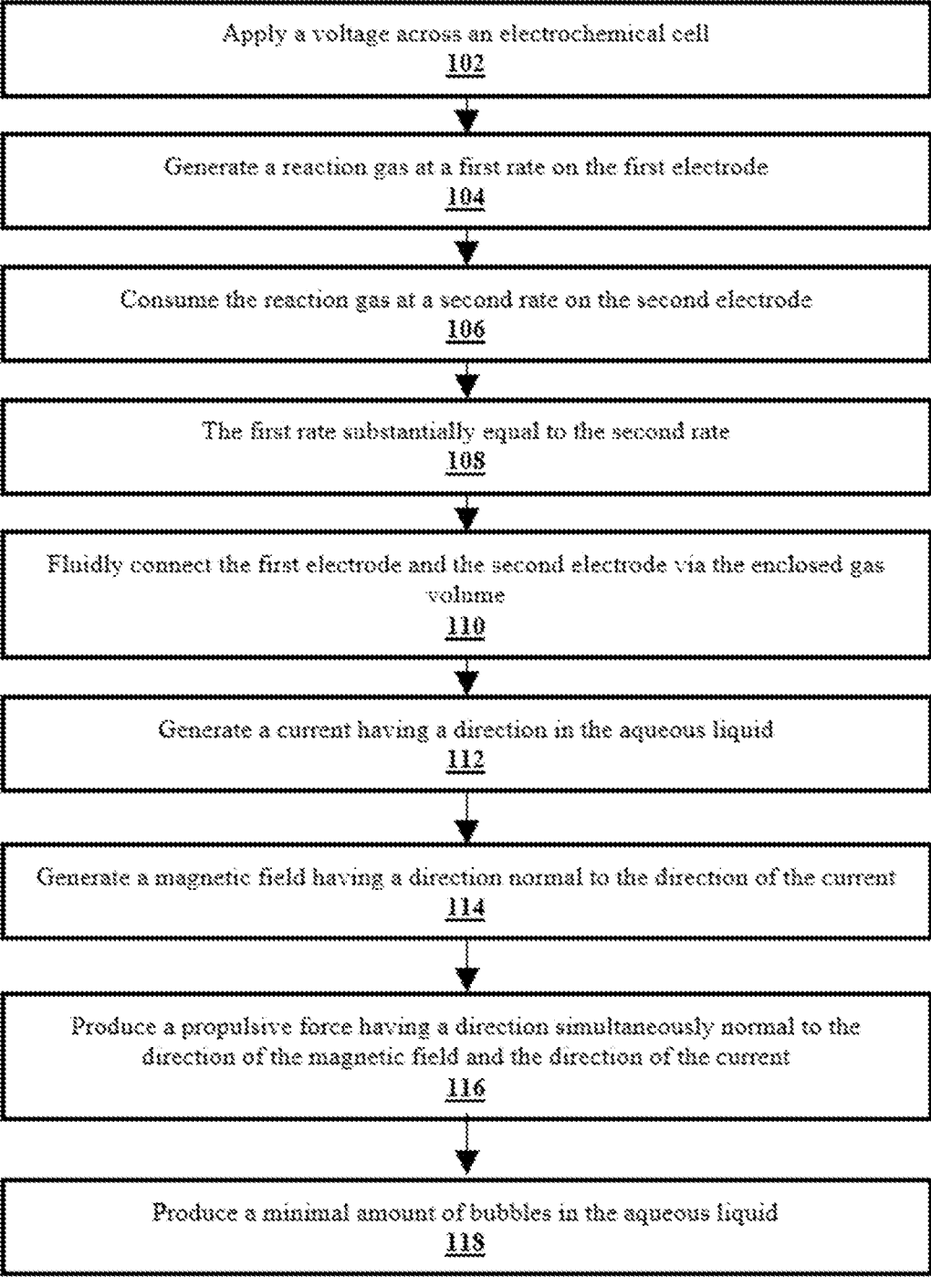

100

Apply a voltage across an electrochemical cell
102

Generate a reaction gas at a first rate on the first electrode
104

Consume the reaction gas at a second rate on the second electrode
106

The first rate substantially equal to the second rate
108

Fluidly connect the first electrode and the second electrode via the enclosed gas volume
110

Generate a current having a direction in the aqueous liquid
112

Generate a magnetic field having a direction normal to the direction of the current
114

Produce a propulsive force having a direction simultaneously normal to the direction of the magnetic field and the direction of the current
116

Produce a minimal amount of bubbles in the aqueous liquid
118

200

Apply a voltage across an electrochemical cell
202

Generate hydrogen at a first rate on a cathode
204

Consume hydrogen at a second rate on an anode
206

Generate hydrogen at substantially the same rate at which hydrogen is consumed
208

Accelerate aqueous liquid in an enclosed liquid volume
210

Accelerate aqueous liquid with a minimal amount of bubbles in the aqueous liquid
212

MAGNETOHYDRODYNAMIC PUMP

CROSS-REFERENCE TO RELATED APPLICATIONS

This application claims priority to and the benefit of Provisional Application Nos. 63/464,857 and 63/464,864, each filed on May 8, 2023, in the United States Patent and Trademark Office, the entire content of each of which is incorporated herein by reference.

BACKGROUND

1. Field

One or more aspects of embodiments of the present disclosure relate to a magnetohydrodynamic device utilized as a water pump or nautical propulsion system. The magnetohydrodynamic device includes a magnet and an electrochemical cell configured to provide a method to produce electrical current in a body of water.

2. Description of the Related Art

Comparable magnetohydrodynamic underwater pumps and propulsion systems generate electrical current with an electrochemical cell that generates hydrogen gas at the anode and generates oxygen or chlorine gas at the cathode. The gas bubbles produced at both (e.g., simultaneously) the cathode and anode create several disadvantages which include i) blocking the electrode surface and thereby reducing current density, ii) erosion and/or corrosion of components such as the electrode catalyst, current collector, and other metallic surfaces, iii) noise and a visible signature. See, e.g., Church et al., WO 1989009724 A1; and Yamato, "The World's First Superconducting Magnetohydrodynamic Propulsion Ship," March 1997, Ship & Ocean Foundation, ISBN 4-916148-02-9, the entire content of each of which is incorporated by reference herein.

Comparable pumping and propulsion magnetohydrodynamic devices utilize an electrochemical cell with each electrode having a catalyst on a solid support. The generation of gas at both electrodes results in the formation of bubbles that are released into the electrolyte. The abundant generation of gases and bubbles presents limitations to this technology. Comparable hydrogen gas generation from renewable energy source technologies includes a water electrolyzer (i.e., water electrolysis cell) that generates gas at both electrodes but utilizes gas diffusion electrodes to reduce and/or eliminate the amount of bubble formation. Comparable electrical energy generation technologies include $H_2/O_2$ (air) fuel cells that consume gas at both electrodes and also utilize gas diffusion electrodes. Electrochemical hydrogen pump systems include an electrochemical hydrogen pump with internal humidifier and dead-end anode channel. For example, electrochemical hydrogen pump systems pressurize hydrogen and utilize a proton exchange membrane to transport hydrogen from one side at a low pressure to a second side at higher pressure. See, e.g., "Characterization of an electrochemical hydrogen pump with internal humidifier and dead-end anode channel", Hao et al., Int. J. Hyd. Ener. 41, 13879-13887 (2016), the entire content of which is incorporated by reference herein.

The need exists (or there is a desire) for a magnetohydrodynamic pump and/or propulsion system that combines a gas consumption electrode with a gas generation electrode, to minimize the generation of gases that create bubbles (e.g., in a liquid located in the surroundings of the system).

The information in this Background section disclosed herein is only for enhancement of understanding of the background and related art of the present disclosure and therefore it may contain information that does not constitute prior art.

SUMMARY

Aspect(s) of one or more embodiments of the present disclosure are directed toward a magnetohydrodynamic device. One or more embodiments of the present disclosure provide an efficient, magnetohydrodynamic (MHD) device that acts on an aqueous liquid as a pump or propulsion system to further move (e.g., accelerate) the aqueous liquid. The MHD device includes a magnet and a novel electrochemical cell that produces a current in (e.g., through) the aqueous liquid and contains a gas generation electrode and a gas consumption electrode designed to generate and consume the same reaction gas (e.g., $H_2$, $O_2$, $Cl_2$) at the same (e.g., substantially the same) rate. The electrodes may include gas diffusion electrodes that isolate the reaction gas from the aqueous liquid.

Additional aspect(s) will be set forth in part in the description which follows and, in part, will be apparent from the description, or may be learned by practice of the presented embodiments of the disclosure.

One or more embodiments of the present disclosure provide a magnetohydrodynamic (MHD) device including an electrochemical cell including: a first electrode configured to generate a reaction gas at a first rate, a second electrode configured to consume the reaction gas at a second rate, the first rate being substantially equal to the second rate, and an enclosed gas volume fluidly connecting the first electrode and the second electrode; an aqueous liquid between the first electrode and the second electrode and including a current having a direction; and a magnet configured to generate a magnetic field having a direction normal to the direction of the current, the MHD device being configured to produce a propulsive force having a direction simultaneously normal to the direction of the magnetic field and the direction of the current.

In some embodiments, the aqueous liquid includes a plurality of mobile ions.

In some embodiments, the propulsive force accelerates the plurality of mobile ions.

In some embodiments, the plurality of mobile ions includes sodium and chloride.

In some embodiments, at least one of the first electrode or the second electrode includes a gas diffusion electrode.

In some embodiments, the gas diffusion electrode includes a gas permeable membrane.

In some embodiments, the gas permeable membrane has pores with an average pore size from about 0.05 micrometer (µm) to about 100 µm.

In some embodiments, the gas diffusion electrode further includes a catalyst, an additive, or a combination thereof.

In some embodiments, the reaction gas includes hydrogen, the first electrode includes a cathode configured to reduce water, and the second electrode includes an anode configured to oxidize hydrogen.

In some embodiments, the reaction gas includes oxygen, the first electrode includes an anode configured to oxidize water, and the second electrode includes a cathode configured to reduce oxygen, or the reaction gas includes chlorine, the first electrode includes an anode configured to oxidize chlorine, and the second electrode includes a cathode configured to reduce chlorine.

One or more embodiments of the present disclosure provide a method of operating a magnetohydrodynamic (MHD) device, the MHD device including: an electrochemical cell including a first electrode, a second electrode, and an enclosed gas volume; an aqueous liquid between the first electrode and the second electrode; and a magnet, and the method including: generating a reaction gas at a first rate on the first electrode; consuming the reaction gas at a second rate on the second electrode, the first rate being substantially equal to the second rate; fluidly connecting the first electrode and the second electrode via the enclosed gas volume; generating a current having a direction in the aqueous liquid with the electrochemical cell; generating a magnetic field having a direction normal to the direction of the current with the magnet; and producing a propulsive force having a direction simultaneously normal to the direction of the magnetic field and the direction of the current.

In some embodiments, the reaction gas includes hydrogen, the first electrode includes a cathode configured to reduce water, and the second electrode includes an anode configured to oxidize hydrogen.

In some embodiments, the electrochemical cell includes a current density, the current density is from about 1.0 milliampere per square centimeter ($mA/cm^2$) to about 1000 $mA/cm^2$.

In some embodiments, the propulsive force is produced with a minimal amount of bubbles produced in the aqueous liquid.

One or more embodiments of the present disclosure provide a method of operating a water pump, the water pump including: the MHD device as described herein; and the aqueous liquid, and the method including: applying a current density across the electrochemical cell; and accelerating the aqueous liquid.

In some embodiments, the reaction gas includes hydrogen, the first electrode includes a cathode configured to reduce water, and the second electrode includes an anode configured to oxidize hydrogen.

In some embodiments, the method accelerates the aqueous liquid with a minimal amount of bubbles produced in the aqueous liquid.

One or more embodiments of the present disclosure provide a propulsion system for a sea ship, the propulsion system including the sea ship connected to the MHD device of claim 1, wherein the aqueous liquid is seawater and the system is configured to apply a current density across the electrochemical cell and propel the sea ship through the seawater.

In some embodiments, the reaction gas includes hydrogen, the first electrode includes a cathode configured to reduce water, and the second electrode includes an anode configured to oxidize hydrogen.

In some embodiments, the system is configured to propel the sea ship through the seawater with a minimal amount of bubbles produced in the seawater.

In some embodiments, the sea ship includes an unmanned underwater vehicle.

In some embodiments, the unmanned underwater vehicle includes an autonomous system.

BRIEF DESCRIPTION OF THE DRAWINGS

The accompanying drawings are included to provide a further understanding of the present disclosure, and are incorporated in and constitute a part of this specification.

The drawings illustrate example embodiments, and facilitate explanation of the principles of the present disclosure, together with the detailed description.

Figure 1:
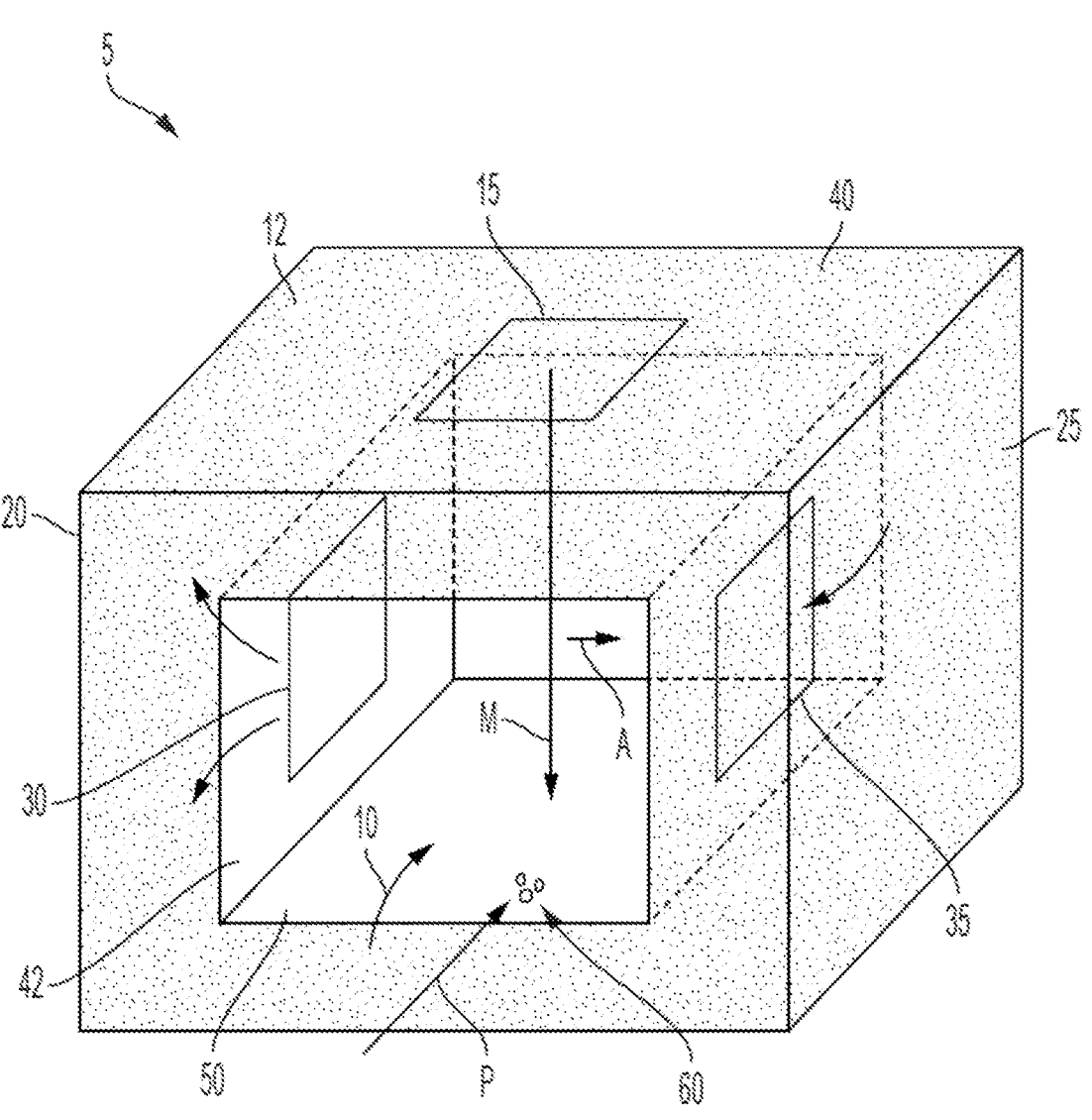
Figure 2:
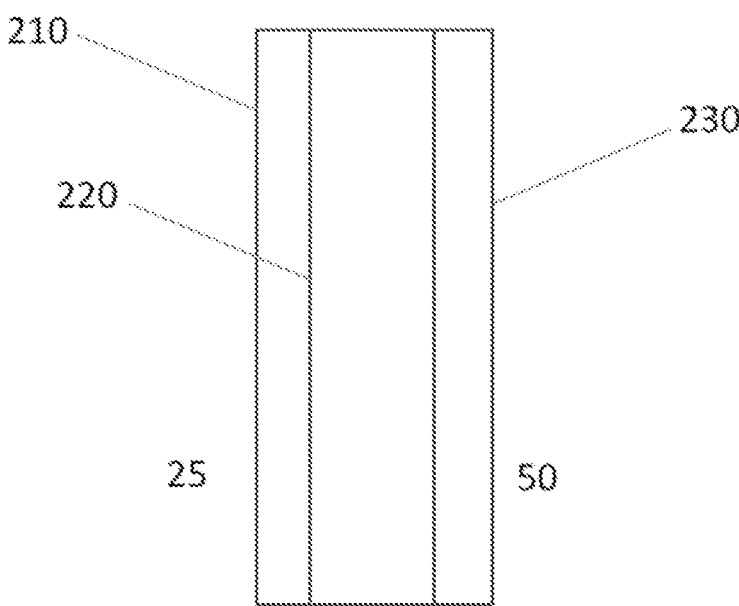
Figure 4:
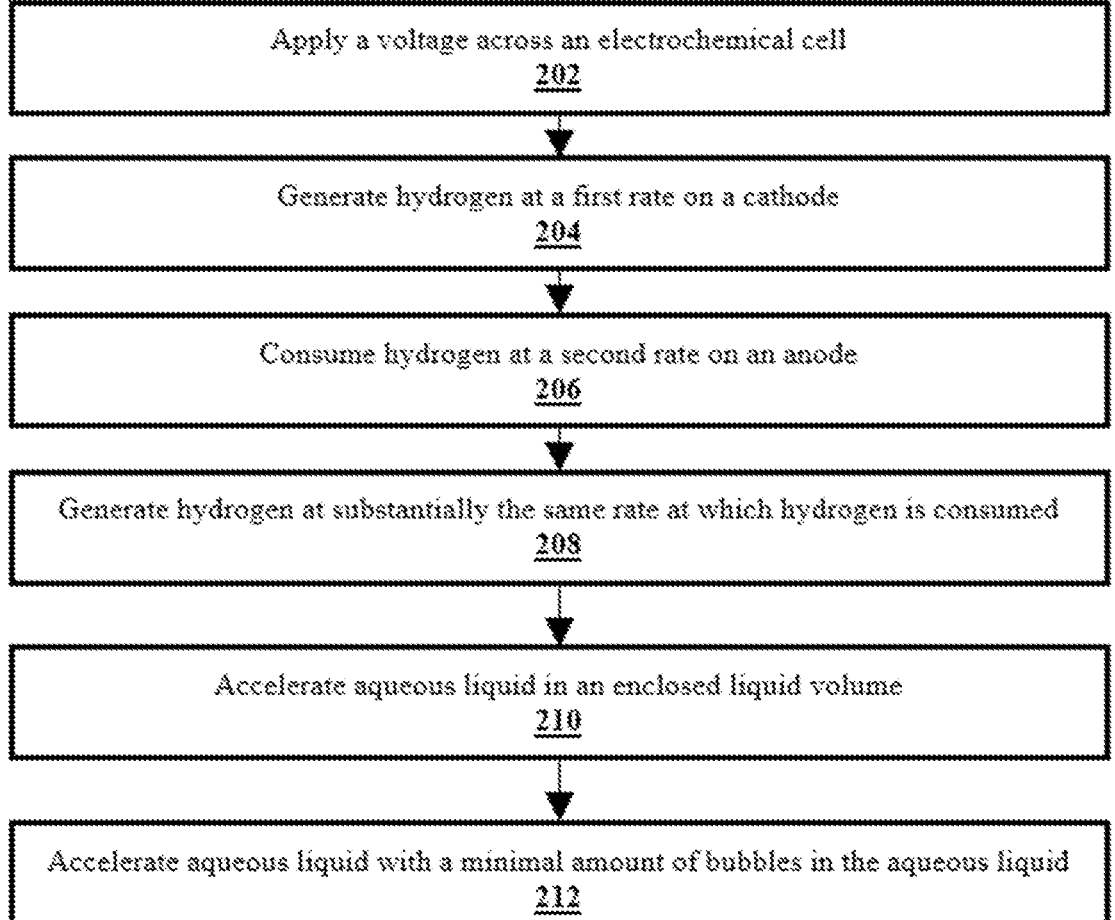

Features will be apparent to those of skill in the art by describing in more detail example embodiments with reference to the attached drawings in which:

FIG. 1 is a perspective schematic view of a magnetohydrodynamic (MHD) device according to one or more embodiments of the present disclosure;

FIG. 2 is a schematic view of a gas permeable electrode according to one or more embodiments of the present disclosure;

FIG. 3 is a schematic of a method of operating the MHD device according to one or more embodiments of the present disclosure; and FIG. 4 is a schematic of a method of operating a water pump including the MHD device according to one or more embodiments of the present disclosure.

DETAILED DESCRIPTION

Introduction

The present disclosure relates to a magnetohydrodynamic (MHD) device configured to accelerate an aqueous liquid (e.g., flowing seawater), and function as a water pump or propulsion system (e.g., for naval vessels, underwater vehicles). The MHD device includes an electrochemical cell that produces an electric current in (e.g., through) the aqueous liquid and may produce the electric current while introducing a minimum of gas products that create bubbles into the surroundings (i.e., the aqueous liquid). The MHD device includes at least one magnet that produces a magnetic field.

The electrochemical cell disclosed herein provides novelty over comparable magnetohydrodynamic systems because it generates and consumes the same reaction gas (e.g., $H_2$, $O_2$, $Cl_2$) at the same (e.g., substantially the same) rate. The electrochemical cell may minimize, or avoid, the production of (e.g., any net) reaction gas. The electrochemical cell includes gas diffusion electrodes that extract the reaction gas as it is being formed or consumed to minimize, or avoid, the formation of bubbles in the aqueous liquid (e.g., flowing seawater). An enclosed gas volume allows the reaction gas that is generated at a gas generation electrode to be stored and move toward the gas consumption electrode. This system is designed so that the electrochemical cell produces a current in (e.g., through) the aqueous liquid (e.g., flowing seawater), but results in little, or no, net change to the system because the reactants are the same as the products. In some embodiments, the electrochemical cell may be utilized as a gas pump that transports the reaction gas from the gas generation electrode to the gas consumption electrode through the enclosed gas volume to enable electrical current to flow in (e.g., through) the aqueous liquid (e.g., flowing seawater) with little, or no (e.g., any), net change in the system (i.e., little or no additional gas is produced).

In one or more embodiments, producing a minimal amount of gas bubbles provides the MHD device described herein with several advantages with respect to comparable magnetohydrodynamic devices. The minimal amount of gas bubbles produced at the surface of the electrode prevents or reduces interference of interactions between ionic species in the electrolyte solution and the electrode. The minimal amount of gas bubbles also enables maximal current density that may decrease electrode erosion and/or corrosion to enhance or improve device lifetime, and may also enhance or improve pump and/or propulsion efficiency. Utilization of hydrogen as the reaction gas may eliminate highly reactive (e.g., oxidative) and highly corrosive species (e.g., oxygen, chlorine), to reduce or prevent corrosion and/or erosion to the electrode and catalyst surfaces, thereby enhancing or improving device lifetime.

In one or more embodiments, producing a minimal amount of bubbles provides the MHD device described herein with several potential commercial applications. The minimal amount or bubble enables the operation of a reduced noise system that may be highly efficient when utilized as a propulsion systems for underwater vehicles. For example, extra-large unmanned underwater vehicles of interest to aerospace and/or defense systems (e.g., autonomous systems).

In one or more embodiments, the electrochemical cell of the MHD device described herein may be similar to an electrochemical hydrogen pump as described in the related art. One primary difference being that the proton exchange membrane of the electrochemical hydrogen pump is replaced with an aqueous liquid (e.g., flowing seawater) and the enclosed gas volume enables the reaction gas generated at one electrode (e.g., cathode) to be consumed at a second electrode (e.g., anode) to maintain a constant pressure.

Definitions

The following description is provided to enable one of ordinary skill in the art to make and use embodiments of the present disclosure and to incorporate such embodiments in the context of certain applications. Various modifications, as well as a variety of uses in different applications will be readily apparent to those skilled in the art, and the general principles defined herein may be applied to a wide range of embodiments.

Thus, the present disclosure is not intended to be limited to the embodiments presented, rather the present disclosure is defined by the scope of claims, and is to be accorded the widest scope consistent with the aspects, principles, and novel features disclosed herein.

In the detailed description that follows, numerous specific details are set forth to provide a more-thorough understanding of some of the embodiments of the present disclosure. However, it will be apparent to one skilled in the art that the present disclosure may be practiced without necessarily being limited to these specific details. In other instances, well-known structures and devices may be shown in block or reduced diagram form, rather than in more detail, to avoid obscuring aspects of the present disclosure.

The reader's attention is directed to all papers and documents that are filed concurrently with this specification and that are open to public inspection with this specification, and the contents of all such papers and documents are incorporated herein by reference. All the features disclosed in this specification (including any accompanying claims, abstract, and drawings) may be replaced by comparable features serving the same, equivalent, or similar purpose, unless expressly stated otherwise. Thus, unless expressly stated otherwise, each feature disclosed is only one example of a generic series of equivalent or similar features. Similarly, unless indicated to the contrary, features of one embodiment may be incorporated into other embodiments without departing from the spirit and scope of the present disclosure.

Unless otherwise defined, all chemical names, technical and scientific terms, and terms defined in common dictionaries should be interpreted as having meanings consistent with the context of the related art, and should not be interpreted in an ideal or overly formal sense. It will be understood that, although the terms first, second, and/or the like may be used herein to describe various elements, these elements should not be limited by these terms. These terms are only used to distinguish one element from another element. Thus, a first element could be termed a second element without departing from the teachings of the present disclosure. Similarly, a second element could be termed a first element.

As used herein, expressions such as "at least one of," "one of," "at least one selected from among," and "selected from among," if (e.g., when) preceding a list of elements, modify the entire list of elements and do not modify the individual elements of the list. As utilized herein, the expressions "at least one of A, B, or C", "one of A, B, C, or a combination thereof" and "one of A, B, C, and a combination thereof" refer to each component and a combination thereof (e.g., A; B; A and B; A and C; B and C; or A, B, and C). For example, "at least one of a to c," "at least one of a, b or c," and "at least one of a, b and/or c" may indicate only a, only b, only c, both (e.g., simultaneously) a and b, both (e.g., simultaneously) a and c, both (e.g., simultaneously) b and c, all of a, b, and c, or variations thereof.

As utilized herein, it is to be understood that the terms such as "including," "includes," "include," "having," "has," "have," "comprises," "comprise," and/or "comprising" are intended to indicate the existence of the features, numbers, steps, actions, components, parts, ingredients, materials, or combinations thereof disclosed in the specification and are not intended to preclude the possibility that one or more other features, numbers, steps, actions, components, parts, ingredients, materials, or combinations thereof may exist or may be added. The term "combination thereof may include a mixture, a laminate, a complex, a copolymer, an alloy, a blend, a reactant of constituents.

As utilized herein, singular forms such as "a," "an," and "the" are intended to include the plural forms as well, unless the context clearly indicates otherwise.

As utilized herein, the terms "use," "using," and "used" may be considered synonymous with the terms "utilize," "utilizing," and "utilized," respectively.

In this context, "consisting essentially of" means that any additional components will not materially affect the chemical, physical, optical, or electrical properties of the semiconductor film.

Furthermore, any element in a claim that does not explicitly state "means for" performing a specified function, or "step for" performing a specific function, is not to be interpreted as a "means" or "step" clause as specified in 35 U.S.C. § 112(f). In particular, the use of "step of" or "act of" in the claims herein is not intended to invoke the provisions of 35 U.S.C. § 112(f).

Example embodiments of the present disclosure will be described with reference to the accompanying drawings. In the drawings, the same or similar reference numerals refer to the same or similar elements throughout, and duplicative descriptions thereof may not be provided the specification. The thickness of layers, films, panels, regions, and/or the like, are exaggerated for clarity. It will be understood that if (e.g., when) an element such as a layer, film, region, or substrate is referred to as being "on" another element, it can be directly on the other element or intervening element(s) may also be present. In contrast, if (e.g., when) an element is referred to as being "directly on" another element, there are no intervening elements present.

Herein, the use of the term "may," when describing embodiments of the present disclosure, refers to "one or more embodiments of the present disclosure." In addition, the use of alternative language, such as "or," when describing embodiments of the present disclosure, refers to "one or more embodiments of the present disclosure" for each corresponding item listed. For example, "A or B" is construed to include A, B, A+B, and/or the like. Similarly, the term "and/or" includes any and all combinations of one or more of the associated listed items. The symbol "/" as utilized herein may be interpreted as "and" or "or" according to the context. Also, the term "exemplary", "preferred", "preferable", "preferably", or the like is intended to refer to an example, embodiment, or illustration.

All references herein to "the" and/or "our" "invention", "invented idea", "system", "this system" (in context with "our system"), "proposed system", "innovative method", "inventive concept", "method", "this circuit", "this architecture", "this", "the current invention", "our switch" and the like shall mean embodiments of the invention.

In the present disclosure, "not include a or any 'component'", "exclude a or any 'component'", "'component'-free", "absence of a or any 'component'", "absent of a or any 'component'", and/or the like, refer to the "component" not being added, included, selected, or utilized as a component in the composition, structure, device, or system, but the "component" of less than a suitable amount may still be included due to other impurities and/or external factors.

Hereinafter, the structure of a magnetohydrodynamic (MHD) device according to one or more embodiments is described with reference to FIG. 1.

Magnetohydrodynamic (MHD) Device

In FIG. 1, the MHD device 5 may include a housing 40 having a front surface and rear surface, each having an open center area. The housing 40 includes four solid external surfaces one of which is an upper surface 12 that may include a magnet 15. The housing 40 includes a first inner wall 42 that is one of four inner walls that may define an enclosed liquid volume 50 in which an aqueous liquid 10 may flow through. For example, the aqueous liquid 10 may flow into the open center area of the front surface to enter the enclosed liquid volume 50. The housing 40 may be constructed from at least one suitable material non-limiting examples of which include a polymer, fiberglass, metal, and a combination thereof.

The housing 40 may include an electrochemical cell 20 including a first electrode 30 and a second electrode 35. The four inner walls including the first inner wall 42 may define an enclosed gas volume 25 that may fluidly connect the first electrode 30 to the second electrode 35. The enclosed gas volume 25 may provide storage of a reaction gas that is generated at the first electrode 30, and may be a conduit to transport the reaction gas to the second electrode 35 where consumption of the reaction gas may occur.

FIG. 1 depicts an electrochemical reaction occurring at the first electrode 30 to generate the reaction gas that may be released into the enclosed gas volume 25 and may travel to the second electrode 35 where the reaction gas may be consumed by the reverse electrochemical reaction. The first electrode 30 may be configured to generate the reaction gas at a first rate and the second electrode 35 may be configured to consume the reaction gas at a second rate. The first rate may be equal (e.g., substantially equal) to the second rate, such that operating the MHD device 5 may produce a minimum of an overall amount of the reaction gas. In some embodiments, operating the MHD device 5 may produce no overall (e.g., any net) amount of the reaction gas. The MHD device 5 may provide an advantage or enhancement over a comparable magnetohydrodynamic device because the first electrode 30 (e.g., a gas generation electrode) and the second electrode 35 (e.g., gas consumption electrode) may be configured to generate and consume the same reaction gas (e.g., $H_2$, $O_2$, $Cl_2$) at the same, or substantially the same, rate. At the first electrode 30, an electrochemical reaction may proceed (e.g., occur) in a forward direction and a substantially similar (e.g., identical other than direction) electrochemical reaction may proceed (e.g., occur) in the reverse direction at the second electrode 35. In several embodiments, a thermodynamic potential of the electrochemical cell 20 may be substantially zero, (e.g., because the electrochemical reaction that occurs at the two electrodes may be substantially similar other than direction).

The first electrode 30 may be located on the first inner wall 42 and may cover less than the entire surface (e.g., a portion of the surface) the first inner wall 42. In some embodiments, the first electrode 30 may cover (e.g., substantially) the entire surface of the first inner wall 42. In some embodiments, the first inner wall 42 may include a plurality of first electrodes 30. The second electrode 35 may be located on a second inner wall of the housing 40 and may cover less than the entire surface (e.g., a portion of the surface) the second inner wall. In some embodiments, the second electrode 35 may cover the entire surface of the second inner wall. In some embodiments, the second inner wall may include a plurality of second electrodes 35. In some embodiments, the second electrode 35 may be located on a wall that is opposite (e.g., arranged in a direction parallel) to the first inner wall 42. In some embodiments, the second electrode 35 may be located on a wall that is adjacent (e.g., arranged in a direction normal or perpendicular) to the first inner wall 42.

FIG. 1 shows an embodiment of the first electrode 30 and second electrode 35 having a rectangular shape. In some embodiments, the shape of the first electrode 30 and second electrode 35 may each independently be square, circular, oval, striped, or a combination thereof.

In the enclosed liquid volume 50, the aqueous liquid 10 may be located between the first electrode 30 and the second electrode 35 and may participate in at least one electrochemical reaction occurring within, (e.g., produced by), the electrochemical cell 20. For example, a voltage may be applied between the first electrode 30 and the second electrode 35 to initiate the electrochemical reactions which generate or consume the reaction gas (i.e., to operate the electrochemical cell 20 of the MHD device 5). Operating the MHD device 5 may include applying a current density to or within the electrochemical cell 20. A strength (e.g., an amount) of the current density or voltage that is required to operate the electrochemical cell 20 of the MHD device 5 may be determined by the electrical resistance in the aqueous liquid 10 (e.g., seawater) between the two electrodes and by the magnitude of an overpotential associated with each of the first electrode 30 and the second electrode 35. In some embodiments, the strength (e.g., amount) of current density or voltage may be a relatively small quantity because reverse electrochemical reactions occur at the electrodes and the thermodynamic potential of the electrochemical cell 20 may be substantially zero, as discussed elsewhere herein. In one or more embodiments, the current density of the electrochemical cell (e.g., applied across the electrochemical cell) may be from about 1.0 milliampere per square centimeter ($mA/cm^2$) to about 1000 $mA/cm^2$.

FIG. 1 shows a current (i.e., electrical current) A in (e.g., through) the aqueous liquid 10 that may be generated by the electrochemical reactions. The current A may have a direction. FIG. 1 shows an embodiment in which the direction of the current A flows from the first electrode 30 to the second electrode 35. In some embodiments, the direction of the current A may flow from the second electrode 35 to the first electrode 30.

The aqueous liquid 10 incudes a plurality of mobile ions 60. In one or more embodiments, the mobile ions 60 may include sodium, chloride, magnesium, sulfate, calcium, and potassium. In one or more embodiments, the aqueous liquid 10 may be or include seawater.

The magnet 15 may generate (e.g., be configured to generate) a magnetic field M that has a direction. FIG. 1 shows an embodiment in which the direction of the magnetic field M may be downward, i.e., into the housing 40 of the MHD device 5. In some embodiments, the direction of the magnetic field M may be upward, i.e., away from the housing 40 of the MHD device 5. The magnet 15 includes apparatus to orient at least one component of the magnetic field 15 such that the direction of the magnetic field M (e.g., overall orientation) may be normal or perpendicular to the direction of the current A (i.e., electrical current). In one or more embodiments, the direction of the magnetic field M and the direction of the current A are not parallel. In one or more embodiments, the direction of the magnetic field M is normal or perpendicular (e.g., orthogonal) to the direction of the current A and the MHD device 5 may include a propulsive force P that has a direction. For example, the mobile ions 60 may be subject to (i.e., experience) the propulsive force P that includes a Lorentz force vector "<F>", as described by Equation 1.

$$\vec{F} = L(\vec{I} \times \vec{B})$$ 
<div align="right">Equation 1</div>

In Equation 1, the Lorentz force vector "<F>" is a vector product of "<I>" and "<B>" that are, respectively, a vector of the current A (i.e., electrical current) and a vector of the magnetic field M. "L" is the length over which "<I>" is applied within "<B>". In one or more embodiments, the Lorentz force vector "<F>" may simultaneously be normal or perpendicular (e.g., orthogonal) to the vector "<I>" and the vector "<B>". The "right hand rule" may be used to direction of the Lorentz force vector "<F>" from the directions of the vector of the current A (i.e., electrical current) and the vector of the magnetic field M. In one or more embodiments, a direction of the propulsive force P may simultaneously be normal or perpendicular (e.g., orthogonal) to the direction of the magnetic field M and the direction of the current A (i.e., electrical current). Accordingly, the MHD device 5 is configured to produce the propulsive force P.

In one or more embodiments, the propulsive force P (e.g., the Lorentz force vector "<F>") accelerates (e.g., moves) the mobile ions 60 and the accelerated mobile ions 60 may collide with and transfer momentum to water molecules within in the aqueous liquid 10, thereby accelerating the water molecules within the aqueous liquid 10. The accelerated water molecules may thereby accelerate (e.g., propel) the MHD device 5 and a structure connected to the MHD device 5 through the aqueous liquid 10. For example, if the MHD device 5 is fixed in place it may function as a pump (e.g., water pump) to accelerate the water molecules through the housing 40. If the MHD device is connected to a movable object, such as a naval vessel submerged in sea water, the accelerated water molecules may exert a force on the MHD device to accelerate (e.g., propel) the movable object.

The magnet 15 may be at least one permanent magnet and/or at least one electromagnet. The electromagnet may generate the magnetic field M from an external electrical circuit (i.e., external to the MHD device 5). In one or more embodiments, the electromagnet may include conventional electrical wire (e.g., copper) and/or superconducting wire (e.g., bismuth-strontium-calcium copper oxide).

In one or more embodiments, the strength of the magnetic field M may be from about 0.5 Tesla to about 30 Tesla.

Gas Diffusion Electrode

In FIG. 2, a gas diffusion electrode 200 may include a current collector 210, a gas permeable membrane 220, and a catalyst layer 230. FIG. 2 shows an embodiment where the gas diffusion electrode 200 may be the first electrode 30 that may be a gas generation electrode and the current collector 210 forms an interface with (i.e., is exposed to) the enclosed gas volume 25 and molecules of the reaction gas may contact the current collector 210. The catalyst layer 230 forms an interface with (i.e., is exposed to) the aqueous liquid volume 50. In one or more embodiments, the gas diffusion electrode 200 may be the second electrode 35 that may be a gas consumption electrode.

The gas permeable membrane 220 may be connected to one of the inner walls (e.g., inner wall 42) of the housing 40. The gas permeable membrane 220 may be a semi-porous membrane having pores with a pore size that permits the transport of reaction gas molecules and prevents the transport of water molecules. Similarly, the current collector 210 may be a semi-porous membrane having pores with a pore size that permits the transport of reaction gas molecules and prevents the transport of water molecules. For example, reaction gas generated at the catalyst layer 230 of the first electrode 30 (e.g., gas generation electrode) may enter a first side of the enclosed gas volume 25 through the pores of the gas permeable membrane 220 and may thereby be prevented or protected from contacting the aqueous liquid 10 and/or the aqueous liquid volume 50. Reaction gas in a second side of the enclosed gas volume 25 may pass through the pores of the gas permeable membrane 220 to be consumed at the catalyst layer 230 of the second electrode 35 (e.g., gas consumption electrode) and may thereby be prevented or protected from contacting the aqueous liquid 10 and/or the aqueous liquid volume 50. The electrochemical cell 20 is configured to continuously extract the reaction gas (e.g., as it is generated) into the first side of the enclosed gas volume 25 and continuously consume the reaction gas from the second side of the enclosed gas volume 25 to reduce, minimize, or prevent (e.g., avoid) contact and/or formation of gas (e.g., reaction gas) bubbles in the aqueous liquid 10 and/or the aqueous liquid volume 50. For example, operation of the MHD device 5 may create or generate a minimal amount of additional gas (e.g., reaction gas), i.e., a minimal amount of bubbles are produced in the aqueous liquid 10 (e.g., seawater) outside of the MHD device 5. In some embodiments, the MHD device 5 may be operated without (e.g., in the absence of) creating or generating additional gas (e.g., reaction gas), i.e., no bubbles are produced in the aqueous liquid 10 (e.g., seawater) outside of the MHD device 5. The MHD device 5 may be operated while creating or generating a minimal amount, or in the absence, of bubbles in the enclosed liquid volume 50.

In some embodiments, the gas permeable membrane has pores with a pore size (e.g., an average pore size) from about 0.05 micrometer (μm) to about 100 μm. In some embodiments, the current collector 210 has pores with a pore size (e.g., an average pore size) from about 0.05 μm to about 100 μm. In the present disclosure, when the pores are spherical or circular, "pore size" indicates a pore diameter or an average pore diameter. When the pores are non-spherical or non-circular, the "pore size" indicates a major axis length or an average major axis length. The pore size of the pores may be measured utilizing a scanning electron microscope or a pore size analyzer. When the pore size of the pores is measured utilizing a pore size analyzer, the average pore size is referred to as D50. D50 refers to the average pore size of the pores whose cumulative volume corresponds to 50 vol % in the pore size distribution (e.g., cumulative distribution), and refers to the value of the pore size corresponding to 50% from the smallest pore when the total number of pores is 100% in the distribution curve accumulated in the order of the smallest pore size to the largest pore size.

The catalyst layer 230 may include a catalyst selected according to the reaction occurring at the electrode (e.g., hydrogen oxidation, water reduction). Examples of the catalyst may be or include a carbonaceous material, a transition metal, or a combination thereof, and are not limited thereto.

In one or more embodiments, the gas diffusion electrode 200 comprises at least one additive that may facilitate the separation of components of the electrochemical reactions (e.g., the reaction gas) into the gaseous and liquid phases, and/or may promote wetting of the catalyst. In one or more embodiments, the additive may be selected from a hydrophobic additive and a hydrophilic additive.

In one or more embodiments, at least one of the first electrode or the second electrode may be or include the gas diffusion electrode 200. For example, the first electrode and the second electrode may concurrently (e.g., each simultaneously) be a gas diffusion electrode substantially as described for the gas diffusion electrode 200. The composition and/or structure of the gas permeable membrane, the catalyst, and/or the at least one additive included in the first gas diffusion electrode may be different than those of the second gas diffusion electrode. In one or more embodiments, the composition and/or structure of the gas permeable membrane and/or the at least one additive included in the first gas diffusion electrode may be substantially similar to those of the second gas diffusion electrode.

Reaction Types (Kinds)

Examples of the reaction gas included in the electrochemical cell 20 may be or include hydrogen, water vapor, oxygen, a halogen (e.g., chlorine), carbon monoxide, carbon dioxide, and/or the like.

In some embodiments, the first electrode 30 may be a cathode and the second electrode 35 may be an anode. In other embodiments, the first electrode 30 may be an anode and the second electrode 35 may be a cathode. In some embodiments, the first electrode 30 may be a gas generation (i.e., generating) electrode and the second electrode 35 may be a gas consumption (i.e., consuming) electrode. In other embodiments, the first electrode 30 may be a gas consumption (i.e., consuming) electrode and the second electrode 35 may be a gas generation (i.e., generating) electrode.

In some embodiments, the reaction gas in the electrochemical cell 20 may be hydrogen. For example, the electrochemical cell 20 may be configured to be a hydrogen cell where hydrogen is generated at (e.g., on) the cathode and consumed at the same (e.g., substantially the same) rate at (e.g., on) the anode. For example, the cathode may be configured to reduce water (i.e., consume water) and thereby generate hydrogen according to Equation 2A and the anode may be configured to oxidize hydrogen (i.e., produce water) and thereby consume hydrogen according to Equation 2B.

$$\text{Cathode: } 2H_2O + 2e^- \rightarrow H_2 + 2OH^- \qquad \text{Equation 2A}$$

$$\text{Anode: } H_2 + 2OH^- \rightarrow 2H_2O + 2e^- \qquad \text{Equation 2B}$$

In some embodiments, the reaction gas in the electrochemical cell 20 may be oxygen. The electrochemical cell 20 may be configured to be an oxygen cell that consumes oxygen at (e.g., on) the cathode at the same (e.g., substantially the same) rate at which oxygen is generated at (e.g., on) the anode. For example, the cathode may be configured to reduce oxygen (i.e., consume oxygen) according to Equation 3A and the anode may be configured to oxidize hydroxide ion and thereby produce oxygen according to Equation 3B.

$$\text{Cathode: } O_2 + 2H_2O + 2e^- \rightarrow 4OH^- \qquad \text{Equation 3A}$$

$$\text{Anode: } 4OH^- \rightarrow O_2 + 2H_2O + 2e^- \qquad \text{Equation 3B}$$

In some embodiments, the reaction gas in the electrochemical cell 20 may be chlorine. The electrochemical cell 20 may be configured to be a chlorine cell that consumes chlorine at (e.g., on) the cathode at the same (e.g., substantially the same) rate at which chlorine is generated at (e.g., on) the anode. For example, the cathode may be configured to reduce chlorine (i.e., consume chlorine) according to Equation 4A and the anode may be configured to oxidize chloride ion and thereby produce chlorine according to Equation 4B.

$$\text{Cathode: } Cl_2 + 2e^- \rightarrow 2Cl \qquad \text{Equation 4A}$$

$$\text{Anode: } 2Cl^- \rightarrow Cl_2 + 2e^- \qquad \text{Equation 4B}$$

Configuration of the electrochemical cell 20 as the hydrogen cell provides the advantage that less overpotential may be required to operate the electrochemical cell 20 compared to the amount of overpotential required to operate the oxygen cell or the chlorine cell. Configuration of the electrochemical cell 20 as the hydrogen cell also avoids the highly reactive and highly corrosive conditions associated with oxygen and chlorine gases. The absence or elimination of highly reactive (e.g., oxidative) and highly corrosive species (e.g., oxygen, chlorine), results in less corrosion and erosion to the electrode and/or catalyst surfaces to enhance or improve device lifetime thereby.

Method of Operating an MHD Device

Referring to FIG. 3, a method of operating the MHD device according to one or more embodiments of the present disclosure is shown. In FIG. 3, method 100 may include step 102 applying a current density or a voltage across the electrochemical cell. The method may include step 104 generating a reaction gas at a first rate on the first electrode, and step 106 consuming the reaction gas at a second rate on the second electrode. In some embodiments, the method may include step 108 where the first rate is (e.g., being) equal (e.g., substantially equal) to the second rate. In some embodiments, the electrochemical cell may be a hydrogen cell and the current density or the voltage may initiate generation of hydrogen at (e.g., on) the cathode and consumption of hydrogen at (e.g., on) the anode. In one or more embodiments, the method may include generating hydrogen at the same (e.g., substantially the same) rate at which hydrogen is consumed. For example, the electrochemical cell may be a hydrogen cell, that reduces (e.g., consumes) water to generate hydrogen at (e.g., on) the cathode and oxidizes (e.g., consumes) hydrogen to produce water at (e.g., on) the anode. In one or more embodiments, the method may include reducing hydrogen at the same (e.g., substantially the same) rate at which hydrogen is oxidized. The method may include step 110 fluidly connecting the first electrode and the second electrode via the enclosed gas volume.

In one or more embodiments, the method may include step 112 generating a current in the aqueous liquid, and the current may be generated with the electrochemical cell. The current may have a direction in or through the aqueous liquid. The method may include step 114 generating a magnetic field with the magnet. The magnetic field may have a direction normal (or perpendicular) to the direction of the current.

In one or more embodiments, the method may include step 116 producing a propulsive force that has a direction that is simultaneously normal to the direction of the magnetic field and the direction of the current. The method may include step 118 producing a minimal amount of bubbles in the aqueous liquid. For example, the method may be or include a reduced noise method wherein a minimal amount of bubbles is produced in the aqueous liquid. In one or more embodiments of the method, the current density of the electrochemical cell (e.g., applied across the electrochemical cell) may be from about 1.0 mA/cm$^2$ to about 1000 mA/cm$^2$.

In some embodiments, steps 102 to 118 of method 100 may occur sequentially as shown in FIG. 3. It should be understood that some embodiments of method 100 may include an overlap of the processes performed in one or more of steps 102 to 118, such that at least a portion of the action(s) of two or more steps may be performed simultaneously.

Water Pump

One or more embodiments of the present disclosure include a method of operating a water pump that includes the MHD device as disclosed herein. Returning to FIG. 1, the water pump may include the enclosed liquid volume 50 in which the aqueous liquid 10 is located. For example, the aqueous liquid 10 may flow through the enclosed liquid volume 50. Referring to FIG. 4, method 200 may include step 202 applying a current density or a voltage across the electrochemical cell 20. For example, the electrochemical cell 20 may be a hydrogen cell and the current density or the voltage may initiate step 204 generation of hydrogen at (e.g., on) the cathode and step 206 consumption of hydrogen at (e.g., on) the anode. In one or more embodiments, the method may include step 208 generating hydrogen at the same (e.g., substantially the same) rate at which hydrogen is consumed. For example, the electrochemical cell 20 may be a hydrogen cell, that reduces (e.g., consumes) water to generate hydrogen at (e.g., on) the cathode and oxidizes (e.g., consumes) hydrogen to produce water at (e.g., on) the anode. In one or more embodiments, the method may include reducing hydrogen at the same (e.g., substantially the same) rate at which hydrogen is oxidized.

In one or more embodiments, the method may include step 210 accelerating the aqueous liquid 10 in, or through, the enclosed liquid volume 50. The method may include step 212 accelerating the aqueous liquid 10 with an absence of bubbles produced in the aqueous liquid 10. For example, the method may be or include a "bubble-free" method wherein no bubbles are produced in the aqueous liquid, e.g., an absence of bubble is produced in the aqueous liquid.

In one or more embodiments of the method, the current density of the electrochemical cell (e.g., applied across the electrochemical cell) may be from about 1.0 mA/cm$^2$ to about 1000 mA/cm$^2$.

In some embodiments, steps 202 to 212 of method 200 may occur sequentially as shown in FIG. 4. It should be understood that some embodiments of method 200 may include an overlap of the processes performed in one or more of steps 202 to 212, such that at least a portion of the action(s) of two or more steps may be performed simultaneously.

Propulsion System

One or more embodiments include a propulsion system for a sea ship that includes the magnetohydrodynamic (MHD) device of the present disclosure. The propulsion system includes the sea ship connected to the MHD device, wherein the aqueous liquid is seawater. For example, seawater may flow through the enclosed liquid volume 50. The propulsion system includes accelerating the seawater in the enclosed liquid volume 50, as described elsewhere herein.

In one or more embodiments, the propulsion system may be configured to apply a current density or a voltage across the electrochemical cell 20, i.e., the propulsion system may include applying a current density or a voltage across the electrochemical cell 20. A current density (e.g., that is required or resultant) of the electrochemical cell may be from about 1.0 mA/cm$^2$ to about 1000 mA/cm$^2$. In one or more embodiments, the electrochemical cell 20 of the propulsion system may be a hydrogen cell and the current density or the voltage may initiate generation of hydrogen at (e.g., on) the cathode and consumption of hydrogen at (e.g., on) the anode. In one or more embodiments, the propulsion system may include generating hydrogen at the same (e.g., substantially the same) rate at which hydrogen is consumed.

In one or more embodiments, the propulsion system may be configured to propel the sea ship in or through the seawater. For example, the propulsion system may include propelling the sea ship in or through the seawater. In one or more embodiments, the propulsion system may include a minimal amount, or an absence, of bubbles produced in the seawater. For example, the method may be or include a reduced-noise method wherein a minimal amount of bubbles are produced in the seawater. In some embodiments, the method may be or include a "bubble-free" method wherein no bubbles are produced in the seawater.

In one or more embodiments, the propulsion system may be utilized in an unmanned underwater vehicle. For example, the unmanned underwater vehicle may be utilized in an autonomous system.

It will be understood that when an element or layer is referred to as being "on," "connected to," "coupled to," or "adjacent to" another element or layer, it can be directly on, connected to, coupled to, or adjacent to the other element or layer, or one or more intervening elements or layers may be present. In contrast, when an element or layer is referred to as being "directly on," "directly connected to," "directly coupled to," or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the terms "use," "using," and "used" may be considered synonymous with the terms "utilize," "utilizing," and "utilized," respectively.

The magnetohydrodynamic (MHD) device and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, and/or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While the present disclosure has been described in connection with certain example embodiments, it is to be understood that the present disclosure is not limited to the disclosed embodiments, but, on the contrary, is intended to cover various modifications and equivalent arrangements included within the spirit and scope of the claims, and equivalents thereof.

Hereinafter, the annotations used in FIGS. 1 and 2 are listed.

5: MHD device
10: Aqueous liquid
12: Upper surface of housing
15: Magnet
20: Electrochemical cell
25: Enclosed gas volume
30: First electrode
35: Second electrode
40: Housing
42: Inner wall
50: Enclosed liquid volume
60: Mobile ions
200: Gas diffusion electrode 210: Current collector
220: Gas permeable membrane
230: Catalyst layer

What is claimed is:

1. A magnetohydrodynamic (MHD) device, the MHD device comprising:
   an electrochemical cell comprising:
      a first electrode configured to generate a reaction gas at a first rate, a second electrode configured to consume the reaction gas at a second rate, the first rate being substantially equal to the second rate, and
      an enclosed gas volume fluidly connecting the first electrode and the second electrode;
   an aqueous liquid between the first electrode and the second electrode and comprising a current having a direction; and
   a magnet configured to generate a magnetic field having a direction normal to the direction of the current,
   the MHD device being configured to produce a propulsive force having a direction simultaneously normal to the direction of the magnetic field and the direction of the current.

2. The MHD device of claim 1, wherein the aqueous liquid comprises a plurality of mobile ions.

3. The MHD device of claim 2, wherein the propulsive force accelerates the plurality of mobile ions.

4. The MHD device of claim 2, wherein the plurality of mobile ions comprises sodium and chloride.

5. The MHD device of claim 1, wherein at least one of the first electrode or the second electrode comprises a gas diffusion electrode.

6. The MHD device of claim 5, wherein the gas diffusion electrode comprises a gas permeable membrane.

7. The MHD device of claim 6, wherein the gas permeable membrane has pores with an average pore size from about 0.05 micrometer (μm) to about 100 μm.

8. The MHD device of claim 6, wherein the gas diffusion electrode further comprises a catalyst, an additive, or a combination thereof.

9. The MHD device of claim 1, wherein the reaction gas comprises hydrogen, the first electrode comprises a cathode configured to reduce water, and the second electrode comprises an anode configured to oxidize hydrogen.

10. The MHD device of claim 1, wherein
   the reaction gas comprises oxygen, the first electrode comprises an anode configured to oxidize water, and the second electrode comprises a cathode configured to reduce oxygen, or
   the reaction gas comprises chlorine, the first electrode comprises an anode configured to oxidize chlorine, and the second electrode comprises a cathode configured to reduce chlorine.

11. A method of operating a magnetohydrodynamic (MHD) device,
   the MHD device comprising:
      an electrochemical cell comprising a first electrode, a second electrode, and an enclosed gas volume;
      an aqueous liquid between the first electrode and the second electrode; and
      a magnet,
   the method comprising:
      generating a reaction gas at a first rate on the first electrode;
      consuming the reaction gas at a second rate on the second electrode, the first rate being substantially equal to the second rate;

17 fluidly connecting the first electrode and the second electrode via the enclosed gas volume;

generating a current having a direction in the aqueous liquid with the electrochemical cell;

generating a magnetic field having a direction normal to the direction of the current with the magnet; and producing a propulsive force having a direction simultaneously normal to the direction of the magnetic field and the direction of the current.

12. The method of claim 11, wherein the reaction gas comprises hydrogen, the first electrode comprises a cathode configured to reduce water, and the second electrode comprises an anode configured to oxidize hydrogen.

13. The method of claim 11, wherein the electrochemical cell comprises a current density, the current density is from about 1.0 milliampere per square centimeter (mA/cm$^2$) to about 1000 mA/cm$^2$.

14. The method of claim 11, wherein the propulsive force is produced with a minimal amount of bubbles produced in the aqueous liquid.

15. A method of operating a water pump, the water pump comprising:

the MHD device of claim 1; and the aqueous liquid, and the method comprising:

applying a current density across the electrochemical cell; and accelerating the aqueous liquid.

16. The method of claim 15, wherein the reaction gas comprises hydrogen, the first electrode comprises a cathode configured to reduce water, and the second electrode comprises an anode configured to oxidize hydrogen.

17. The method of claim 15, wherein the method accelerates the aqueous liquid with a minimal amount of bubbles produced in the aqueous liquid.

18. A propulsion system for a sea ship, the propulsion system comprising the sea ship connected to the MHD device of claim 1, wherein the aqueous liquid is seawater and the system is configured to apply a current density across the electrochemical cell and propel the sea ship through the seawater.

19. The propulsion system of claim 18, wherein the reaction gas comprises hydrogen, the first electrode comprises a cathode configured to reduce water, and the second electrode comprises an anode configured to oxidize hydrogen.

20. The propulsion system of claim 18, wherein the system is configured to propel the sea ship through the seawater with a minimal amount of bubbles produced in the seawater.

21. The propulsion system of claim 18, wherein the sea ship comprises an unmanned underwater vehicle.

22. The propulsion system of claim 21, wherein the unmanned underwater vehicle comprises an autonomous system.

* * * * *